(No Model.)
G. H. GOETCHINS.
CHEESE VAT.
No. 281,053. Patented July 10, 1883.
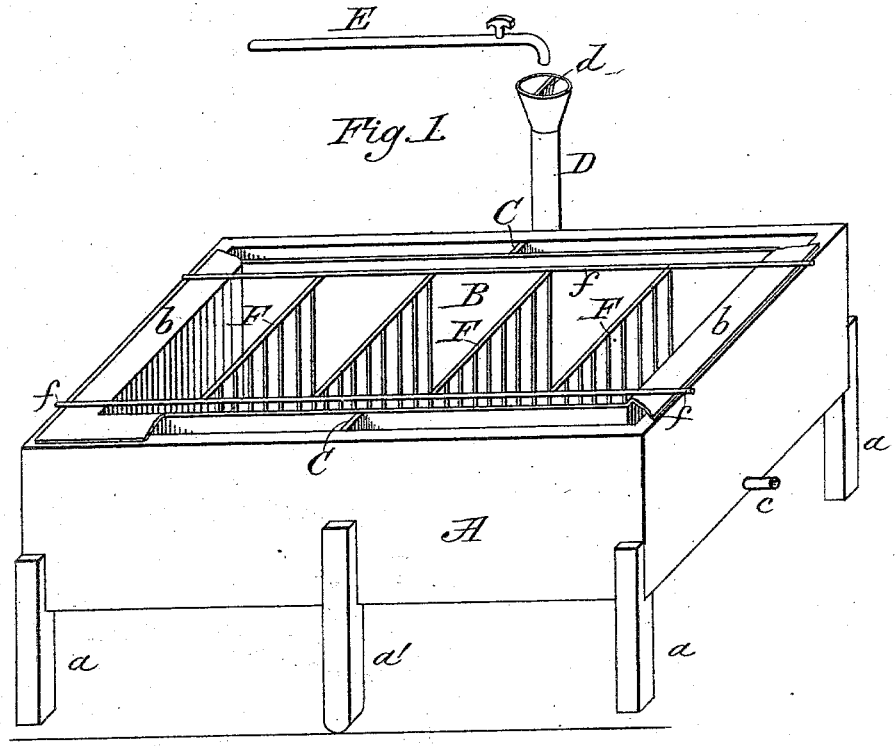
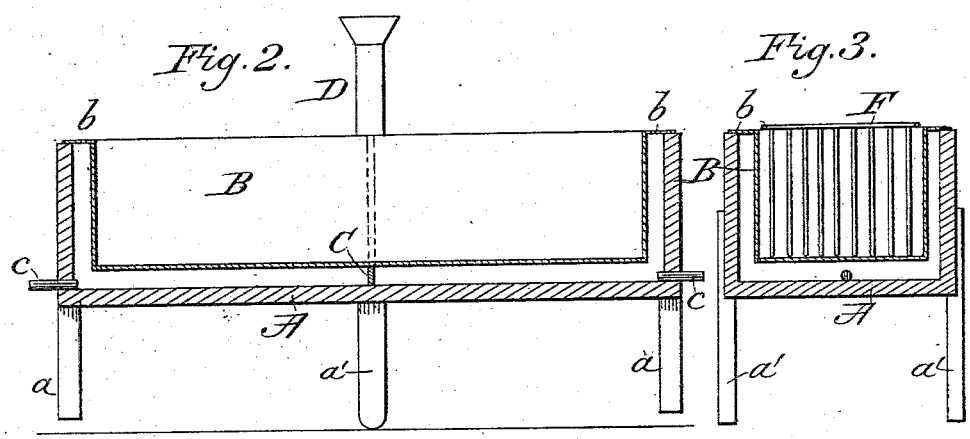
Attest:
F. H. Schott
A. R. Brown.
Inventor:
George H. Goetchins.
Geo. J. C. Tasker atty.

UNITED STATES PATENT OFFICE.

GEORGE H. GOETCHINS, OF LITTLE FALLS, NEW YORK, ASSIGNOR TO EUGENIA A. GOETCHINS, OF SAME PLACE.

CHEESE-VAT.

SPECIFICATION forming part of Letters Patent No. 281,053, dated July 10, 1883.

Application filed March 26, 1883. (No model.)

*To all whom it may concern:*

Be it known that I, GEORGE H. GOETCHINS, a citizen of the United States, residing at Little Falls, in the county of Herkimer and State of New York, have invented certain new and useful Improvements in Cheese-Vats; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an oscillating cheese-vat provided with rakes or division-racks for agitating the contents of the vat, as hereinafter more fully set forth.

In the annexed drawings, illustrating the invention, Figure 1 represents a perspective view of my improved cheese-vat. Fig. 2 is a longitudinal section of the vat with rakes or racks removed. Fig. 3 is a transverse section with the rakes or racks in position.

Like letters indicate like parts in the several views.

The letter A designates an exterior vat having legs $a$ $a'$, the central legs, $a'$, being somewhat longer than those at the ends, and serving as a fulcrum upon which the vat can be made to oscillate. An inner vat or pan, B, is supported within the vat A by means of a rim, $b$, that rests on the edge of the outer vat.

In the space between the inner and outer vats is a transverse partition, C, that divides the outer vat into two compartments, each of which is provided with an exit-spout, $c$, for the discharge of water introduced into said compartments. These compartments are supplied with water through a funnel, D, having a longitudinal partition or division-plate, $d$, by which water conveyed to the funnel is passed alternately into each compartment, thereby oscillating the vat.

It will be seen that when the vat is tilted to one end the funnel D will be in position to receive water from the service-pipe E on that side of the divided funnel that communicates with the elevated end of the vat. When a sufficient quantity of water to overbalance the depressed end of the vat is thus received into the compartment at the elevated end, the weight of the water at that end will reverse the position of the vat, and while the water escapes from the discharge-spout $c$ at the lower end the other end of the vat will be filled through the opposite side of the funnel. This alternate filling and emptying of the compartments at opposite ends of the outer vat causes said vat to oscillate, so as to agitate the milk contained in the inner vat or milk-pan.

A series of rakes or racks, F, supported by the longitudinal rods $ff$, that rest on each end of the vat, are suspended in the milk-pan, so as to break up the milk as it moves back and forth with the oscillation of the vat, thus preventing the separation of cream and enabling a larger quantity and a better quality of cheese to be obtained. This application of water as a motive power for oscillating the vat also enables the milk to be kept at the proper temperature, while the movements of the vat, by agitating the milk in contact with the rakes suspended therein, prevent the separation of cream.

Having thus described my invention, what I claim as new, and desire to secure by Letters Patent, is—

1. An oscillating cheese-vat provided with spouts $c$ $c$, a milk-pan, B, a transverse partition, C, in the space between the outer vat and the milk-pan, and a funnel, D, divided by a partition, $d$, whereby water is alternately admitted to and discharged from the compartments at either end of the vat, substantially as described.

2. In an oscillating cheese-vat, the combination, with the milk-pan B, of the rakes F F, suspended therein by rods $ff$, resting on the ends of the vat, substantially as described.

3. The combination of the outer vat, A, having legs $a$ $a$, partition C, and spouts $c$ $c$, the milk-pan or inner vat, B, the rakes F F, suspended therein, and the funnel D, having partition $d$, and communicating with the compartment at each end of the outer vat, substantially as described.

In testimony whereof I affix my signature in presence of two witnesses.

GEORGE H. GOETCHINS.

Witnesses:
JAMES HART,
FRANK P. VAUGHAN.